(12) United States Patent
Zhao et al.

(10) Patent No.: US 6,861,157 B2
(45) Date of Patent: Mar. 1, 2005

(54) ARTICLE FOR HIGH TEMPERATURE SERVICE AND METHOD FOR MANUFACTURE

(75) Inventors: Ji-Cheng Zhao, Niskayuna, NY (US); Melvin Robert Jackson, Niskayuna, NY (US)

(73) Assignee: General Electric Company, Niskayuna, NY (US)

(*) Notice: Subject to any disclaimer, the term of this patent is extended or adjusted under 35 U.S.C. 154(b) by 121 days.

(21) Appl. No.: 10/063,089

(22) Filed: Mar. 18, 2002

(65) Prior Publication Data
US 2003/0186075 A1 Oct. 2, 2003

(51) Int. Cl.[7] .............. B32B 15/04; F03B 3/12; C23C 16/06
(52) U.S. Cl. ............ 428/632; 428/633; 428/669; 428/670; 428/680; 428/336; 428/642; 427/455; 427/585; 427/597; 427/250; 205/255; 416/241 R
(58) Field of Search .............. 428/632, 633, 428/669, 670, 679, 680, 650, 655, 336, 699, 701, 702, 642; 416/241 R; 427/585, 455, 596, 597, 250; 205/255

(56) References Cited

U.S. PATENT DOCUMENTS

| | | | | |
|---|---|---|---|---|
| 3,499,740 A | | 3/1970 | Wade | |
| 4,851,300 A | * | 7/1989 | Przybyszewski | |
| 5,484,263 A | * | 1/1996 | Nagaraj et al. | |
| 6,306,524 B1 | * | 10/2001 | Spitsberg et al. | |
| 6,455,167 B1 | * | 9/2002 | Rigney et al. | 428/472.2 |
| 6,558,813 B2 | * | 5/2003 | Darolia | |
| 6,609,894 B2 | * | 8/2003 | Jackson et al. | 416/224 |
| 6,627,323 B2 | * | 9/2003 | Williams et al. | |
| 6,630,250 B1 | * | 10/2003 | Darolia | |

FOREIGN PATENT DOCUMENTS

| | | |
|---|---|---|
| EP | 0992614 | 4/2000 |
| GB | 1150356 | 4/1969 |

OTHER PUBLICATIONS

European Search Report EP03251596, Feb. 2, 2004.

* cited by examiner

*Primary Examiner*—Jennifer McNeil
(74) *Attorney, Agent, or Firm*—Paul J. DiConza; Patrick K. Patnode

(57) ABSTRACT

Articles for use in a high-temperature, oxidative environment, methods for manufacturing such articles, and a material system for protecting articles in such an environment are provided where, for example, one article comprises a substrate and a protective layer disposed over the substrate, the protective layer comprising at least about 60 atomic percent of a metal selected from the group consisting of platinum (Pt), palladium (Pd), rhodium (Rh), osmium (Os), iridium (Ir), and mixtures thereof.

37 Claims, 2 Drawing Sheets

ARTICLE FOR HIGH TEMPERATURE SERVICE AND METHOD FOR MANUFACTURE

BACKGROUND OF INVENTION

This invention relates to articles for use in high temperature environments. More particularly, this invention relates to articles for use in high temperature, oxidative environments, such as, for example, a gas turbine assembly. This invention also relates to methods for manufacturing such articles.

A number of industries, such as power generation and aerospace, demand equipment for prolonged service at high temperatures and oxidative environments. Equipment such as turbine assemblies, including, for example, aeronautical turbines, land-based turbines, marine-based turbines, and the like, typically include components formed from a class of materials known as superalloys. Superalloys exhibit desirable chemical and physical properties under the high temperature, high stress, and high-pressure conditions generally encountered during turbine operation. Nickel (Ni)-, iron (Fe)-, and cobalt (Co)-based superalloys are of particular interest in such applications.

Turbine assembly components, such as turbine blades, vanes, and combustion components in modern jet engines, for example, often reach temperatures as high as about 1,150° C., which is about 85% of the melting temperatures of most Ni-based superalloys. At such high service temperatures, the superalloys that are used to form the components are highly susceptible to damage from such mechanisms as creep, oxidation, and melting. Thermal barrier coatings are often applied to the surface of superalloy components to afford some means of insulating the metal from the hot gas. The resulting reduction in metal temperatures increases the effective component lifetime at a given operating temperature, or increases the operating temperature a component may be exposed to for a desired lifetime.

Thermal barrier coatings (TBC's) typically comprise ceramics such as yttria-stabilized zirconia. Prior to applying a thermal barrier coating to a superalloy component, a metallic bond coat is generally deposited on the superalloy substrate to provide enhanced protection against oxidation to the superalloy surface. Conventional bond coats used on components exposed to the hot gases of combustion in gas turbine engines include both diffusion aluminides and MCrAl(X) coatings. The term "aluminides" encompasses a wide variety of coatings comprising aluminide compounds of various chemical compositions. For example, nickel aluminide, NiAl, is often grown as an outer coating on a nickel-based superalloy by exposing the superalloy substrate to an aluminum-rich environment at elevated temperatures. The aluminum diffuses into the substrate and combines with the nickel to form a coating of NiAl on the outer surface. A platinum-containing nickel aluminide coating is often formed by electroplating platinum over the nickel-base substrate to a predetermined thickness, followed by exposing the platinum-coated substrate to an aluminum-rich environment at elevated temperatures. In addition to aluminide coatings, MCrAl(X) coatings, where M is at least one of Ni, Co, and Fe, and wherein X is at least one of yttrium (Y), tantalum (Ta), silicon (Si), hafnium (Hf), titanium (Ti), zirconium (Zr), boron (B), carbon (C), are commonly used as bond coats for a TBC system. MCrAl(X) coatings are suitable for application by any of a number of processes, including plasma spraying, high-velocity oxy-fuel (HVOF) spraying, and physical and chemical vapor deposition, as non-limiting examples.

Both the aluminide and MCrAlX bond coats comprise a significant amount of aluminum, and in the case of MCrAlX, a significant amount of chromium as well. During exposure to high temperatures in an oxidative environment, these elements in the bond coat provide oxidation resistance to the substrate by forming a thin, compact, and tightly adherent layer of oxide scale at the interface of the bond coat with the ceramic thermal barrier coating. This scale, also referred to as a "thermally grown oxide" or "TGO," significantly reduces the ability of oxygen to diffuse into the coating to attack the substrate, thereby inhibiting substrate oxidation.

Although effective in extending the high-temperature capability of superalloy components, both the aluminide-with-TBC coating system and the MCrAlX-with-TBC coating system exhibit limitations which continue the need for improved materials for high temperature applications. For example, with time, the aluminum and chromium present in the bond coats become substantially converted into TGO, whereupon the protective capability of the bond coat is exhausted. At this stage the component is susceptible to damage, and thus components are periodically inspected and often repaired or replaced, based on the condition of the coating system and substrate material. This inspection and refurbishment is often time-consuming and expensive, and thus there is a need for coatings, especially bond coats, with enhanced ability to protect the substrate from oxidation. In addition, as the TGO layer grows at the interface of the bond coat with the TBC topcoat, spalling of the TBC often results, causing an immediate rise in temperature, and accelerated degradation, in the spalled area. Thus there is a need for articles and coating systems that resist spalling of the thermal barrier coating. Finally, in advanced turbine assembly design concepts, the surface temperatures of components are expected to exceed the melting points of state-of-the-art superalloys. Therefore, a further need is for articles with enhanced ability to withstand exposure to high temperatures.

SUMMARY OF INVENTION

The present invention provides several embodiments that address these needs. One embodiment is an article for use in a high temperature, oxidative environment. The article comprises a substrate and a protective layer disposed over the substrate, the protective layer comprising at least about 60 atomic percent of a metal selected from the group consisting of platinum (Pt), palladium (Pd), rhodium (Rh), osmium (Os), iridium (Ir), and mixtures thereof.

A second embodiment is a material system for protecting an article in a high temperature, oxidative environment. The system comprises a protective layer comprising at least about 60 atomic percent of a metal selected from the group consisting of Pt, Pd, Rh, Os, Ir and mixtures thereof.

A third embodiment is a method for manufacturing an article for use in a high temperature, oxidative environment. The method comprises providing a substrate, and disposing a protective layer over the substrate, the protective layer comprising at least about 60 atomic percent of a metal selected from the group consisting of Pt, Pd, Rh, Os, Ir, and mixtures thereof.

A fourth embodiment is an article for use in a high temperature, oxidative environment, comprising a substrate comprising at least about 60 atomic percent of a metal selected from the group consisting of Pt, Pd, Rh, Os, Ir, and mixtures thereof; and a thermal barrier layer disposed over the substrate.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DETAILED DESCRIPTION

During service under high temperature, oxidative conditions, as found, for example, in a gas turbine assembly, several modes of degradation operate on a typical bond coat-plus-TBC system, ultimately causing failure by spalling of at least one of the coatings in the system. The formation of TGO at the interface of the bond coat with the TBC topcoat generates interfacial stresses that act to pry the coatings apart. These stresses increase as the thickness of the TGO increases. In addition, the difference in coefficient of thermal expansion (CTE) between the ceramic topcoat and the typical aluminide or MCrAlX bond coat also generates interfacial stresses between the two coatings. The degradation caused by sources of interfacial stresses such as TGO formation and CTE mismatch is exacerbated where the coated component operates on a cycle wherein the temperature of the coated component changes from a high level (for example, during service) to a low level (for example, during a shutdown period). This cycling of temperature causes a corresponding cycling of interfacial stresses, introducing a fatigue component to the failure modes operating at the various coating system interfaces.

The present inventors have found that by selecting specific bond coat materials, and in some cases, substrate materials, such that the materials both minimize the formation of TGO and more closely match the CTE of the TBC than conventional bond coats, the life expectancy of the overall substrate-plus-bond coat-plus-TBC system is significantly increased over conventional systems.

Figure 1:
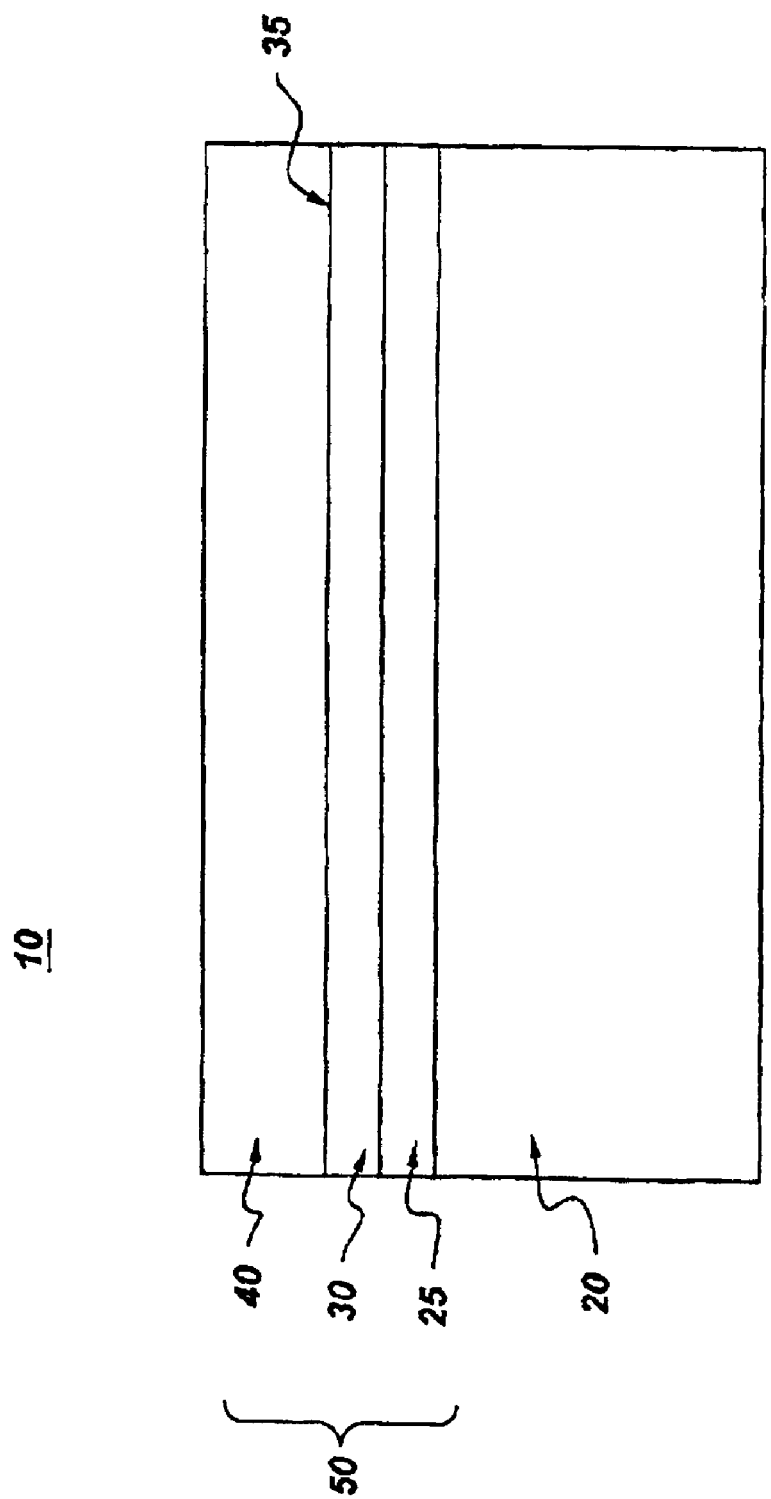
FIG. 1 and FIG. 2 depict schematic cross sections of articles of the present invention.

One embodiment of the present invention is an article for use in a high temperature, oxidative environment. Referring to FIG. 1, article 10 comprises a substrate 20 and a protective layer 30 disposed over the substrate. Protective layer 30 comprises at least about 60 atomic percent of a metal selected from the group consisting of Pt, Pd, Rh, Os, Ir, and mixtures thereof. In certain embodiments, protective layer 30 comprises at least about 85 atomic percent of the metal. Metals of this group are highly resistant to oxidation and other forms of corrosion, and thus are highly effective as protective coatings for substrates exposed to high temperature, oxidative conditions. In order to exploit the benefits of these materials, the metal of protective layer 30 often comprises no more than a total of about 3 atomic percent of elements that are strong oxide-formers, such as, for example, aluminum, chromium, zirconium, and the like. In particular embodiments, protective layer 30 has a thickness of at least about 5 microns, and in specific embodiments the thickness of protective layer 30 is in the range from about 10 microns to about 250 microns.

In some embodiments, article 10 further comprises a top layer 40 disposed over protective layer 30, the top layer 40 comprising a thermal barrier layer 40. In such embodiments, protective layer 30 serves as a bond coat for thermal barrier layer 40. Because the metal comprising protective layer 30 forms little or no TGO during service exposure, the stress at interface 35 between thermal barrier layer 40 and protective layer 35 remains significantly lower than that observed in conventional systems. In certain embodiments, thermal barrier layer 40 comprises a ceramic, and in particular embodiments, thermal barrier layer 40 comprises yttria-stabilized zirconia. The CTE of the metal comprising protective layer 30 more closely matches that of yttria-stabilized zirconia and other ceramics than does that of conventional bond coats. Therefore, for embodiments of the present invention, stress at interface 35 is reduced relative to conventional systems in terms of stress due to TGO formation and due to CTE mismatch between topcoat 40 and protective layer 30. In some embodiments, thermal barrier layer has a thickness of at least about 25 microns; in certain embodiments, the thickness is in the range from about 100 microns to about 250 microns.

In some embodiments, article 10 further comprises a diffusion barrier layer 25 interposed between substrate 20 and protective layer 30. Embodiments comprising diffusion barrier layer 25 include those in which article 10 comprises top layer 40, as well as those in which top layer 40 is not present. Diffusion barrier layer 25 significantly reduces migration of elements via solid state diffusion between substrate 20 and protective layer 30, thereby maintaining an effective concentration of oxidation-resistant elements within protective layer 30, while restricting contamination of protective layer 30 with oxide-forming elements such as aluminum and chromium from substrate 20. In addition, diffusion barrier layer 25 reduces the risk of the formation of intermetallic phases, which may be brittle and have undesirably low melting points, in substrate 20 or protective layer 30. In certain embodiments, diffusion barrier layer 25 comprises ruthenium, such as, for example, the diffusion barrier alloy compositions set forth in U.S. patent application Ser. No. 09/683,700, commonly owned by the present assignee. Diffusion barrier layers comprising ruthenium have been shown to be effective in reducing the formation of undesirable phases in high-temperature coating systems. In certain embodiments, diffusion barrier layer 25 has a thickness in the range from about 5 microns to about 100 microns, and in particular embodiments, the thickness is in the range from about 10 microns to about 50 microns.

In some embodiments, substrate 20 comprises a superalloy, for example, at least one of a cobalt-based alloy, a nickel-based alloy, and an iron-based alloy. The alloy, in some embodiments, comprises one of a single crystal alloy and a directionally solidified alloy, in order to provide substrate 20 with enhanced high-temperature strength. In particular embodiments, substrate 20 comprises a component of a gas turbine assembly, for example, one of a turbine blade, a vane, and a combustor component.

Particular embodiments of the present invention further exploit the advantages described above. One embodiment is a component for a gas turbine assembly, comprising a substrate 20 comprising one of a turbine blade, a vane, and a combustor component; a protective layer 30 disposed over substrate 20, the protective layer 30 comprising at least about 60 atomic percent of a metal selected from the group consisting of Pt, Pd, Rh, Os, Ir, and mixtures thereof; and a thermal barrier layer 40 comprising yttria-stabilized zirconia disposed over protective layer 30. Another embodiment is a component for a gas turbine assembly comprising a substrate 20 comprising one of a turbine blade, a vane, and a combustor component; a diffusion barrier layer 25 disposed over substrate 20, the diffusion barrier layer 25 comprising ruthenium; a protective layer 30 disposed over diffusion barrier layer 25, the protective layer 30 comprising at least about 60 atomic percent of a metal selected from the group consisting of Pt, Pd, Rh, Os, Ir, and mixtures thereof; and a thermal barrier layer 40 comprising yttria-stabilized zirconia disposed over protective layer 30. A third specific embodiment is a component for a gas turbine assembly, comprising a substrate 20 comprising one of a turbine blade, a vane, and a combustor component; a diffusion barrier layer 25 disposed over substrate 20, the diffusion barrier layer 25 comprising ruthenium; and a protective layer 30 disposed over diffusion barrier layer 25, the protective layer comprising at least about 60 atomic percent of a metal selected from the group consisting of Pt, Pd, Rh, Os, Ir, and mixtures thereof. In this embodiment, the high oxidation resistance and melting point provided by the metal provides protection and enhanced high temperature capability for the article, without a thermal barrier layer as a topcoat.

Another embodiment of the present invention is a material system for protecting an article in a high temperature, oxidative environment. As used herein, the term "material system" refers to the combination of layers 50 employed to protect a substrate 20. Each of the alternatives set forth above for the various layers, including, where applicable, diffusion barrier layer 25, protective layer 30, and thermal barrier layer 40, are applicable to the material system 50 embodiments as well. Specific embodiments are also provided to further exploit the advantages of these alternatives. One such embodiment is a material system 50 for protecting a component of a gas turbine assembly, the system 50 comprising a diffusion barrier layer 25 comprising ruthenium; a protective layer 30 disposed over diffusion barrier layer 25, the protective layer 25 comprising at least about 60 atomic percent of a metal selected from the group consisting of Pt, Pd, Rh, Os, Ir, and mixtures thereof; and a thermal barrier layer 40 comprising yttria-stabilized zirconia disposed over protective layer 30. Another such embodiment is a material system 50 for protecting a component of a gas turbine assembly, the system 50 comprising a protective layer 30 comprising at least about 60 atomic percent of a metal selected from the group consisting of Pt, Pd, Rh, Os, Ir, and mixtures thereof; and a thermal barrier layer 40 comprising yttria-stabilized zirconia disposed over protective layer 30.

Another embodiment of the present invention is a method for manufacturing article 10 of the present invention. The alternatives set forth above for article 10 are applicable to article 10 manufactured using the method of the present invention. Disposing thermal barrier layer 40, diffusion barrier layer 25, and protective layer 30 comprises, in certain embodiments, depositing the pertinent layer using at least one of ion plasma deposition, physical vapor deposition, high-velocity oxyfuel deposition, plasma spraying, and chemical vapor deposition. Where a layer is to comprise a metal, such as, for example, in certain alternatives for diffusion barrier layer 25 and protective layer 30, electroplating is also an alternative for disposing the layer. Particular embodiments include a method for manufacturing a component for a gas turbine assembly, comprising providing a substrate 20 selected from the group consisting of a turbine blade, a vane, and a combustor component; disposing a diffusion barrier layer 25 comprising ruthenium over substrate 20; disposing a protective layer 30 over diffusion barrier layer 25, the protective layer 30 comprising at least about 60 atomic percent of a metal selected from the group consisting of Pt, Pd, Rh, Os, Ir, and mixtures thereof; and disposing a thermal barrier layer 40 comprising yttria-stabilized zirconia over protective layer 30. Another particular embodiment is a method for manufacturing a component for a gas turbine assembly, comprising providing a substrate 20 selected from the group consisting of a turbine blade, a vane, and a combustor component; disposing a protective layer 30 over substrate 20, the protective layer 30 comprising at least about 60 atomic percent of a metal selected from the group consisting of Pt, Pd, Rh, Os, Ir, and mixtures thereof; and disposing a thermal barrier layer 40 comprising yttria-stabilized zirconia over protective layer 30.

Figure 2:
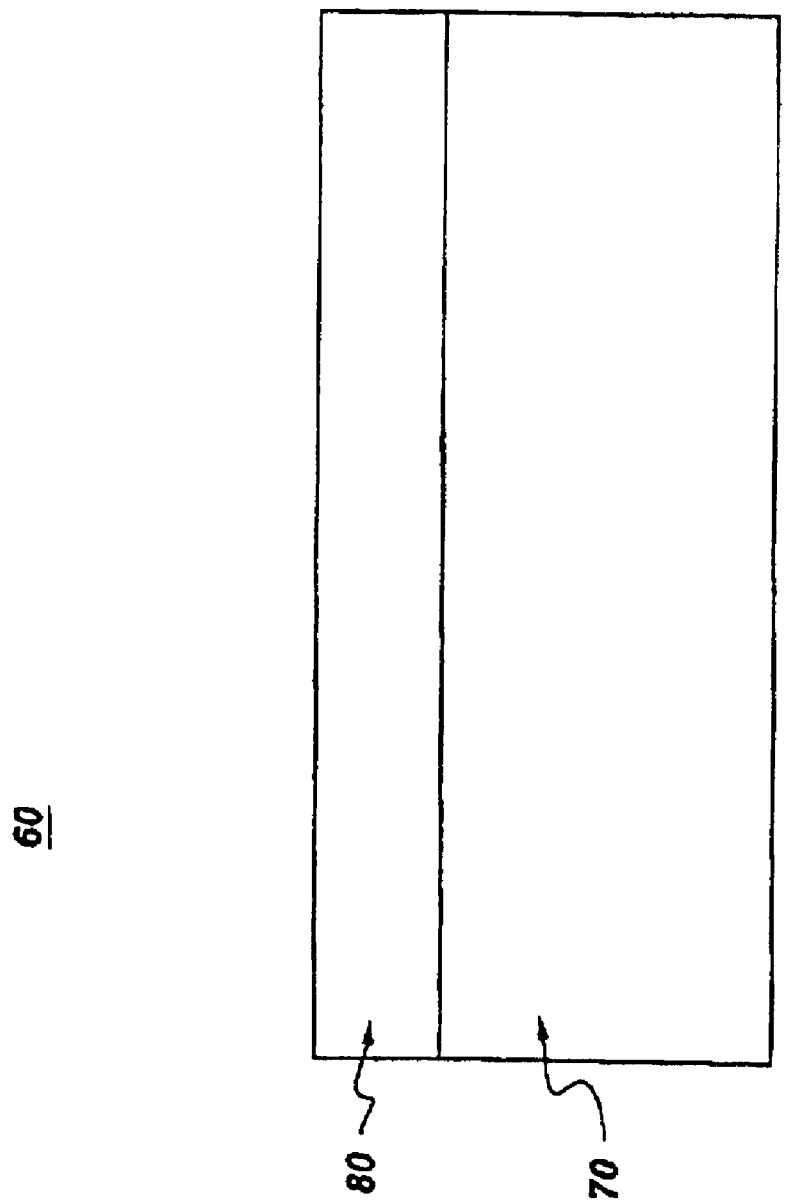

The advantages of using a metal selected from the group consisting of Pt, Pd, Rh, Os, Ir, and mixtures thereof as a foundation for a thermal barrier coating are effective for embodiments in which the metal is in the form of a protective layer 30, as described above, as well as for embodiments in which the substrate itself comprises the metal. Therefore, as depicted in FIG. 2, a further embodiment of the present invention is an article 60 for use in a high temperature, oxidative environment, comprising a substrate 70 comprising at least about 60 atomic percent of a metal selected from the group consisting of Pt, Pd, Rh, Os, Ir, and mixtures thereof; and a thermal barrier layer 80 disposed over substrate 70. The alternatives set forth above for topcoat materials are also applicable in these embodiments. In certain embodiments, topcoat 80 has a thickness in the range from about 50 microns to about 500 microns, and in particular embodiments, the thickness of topcoat 80 is in the range from about 100 to about 250 microns. In some embodiments, substrate 70 comprises at least about 85 atomic percent of a metal selected from the group consisting of Pt, Pd, Rh, Os, Ir, and mixtures thereof. As in previous embodiments, substrate 70 in certain embodiments comprises a gas turbine assembly, including, for example, one of a turbine blade, a vane, and a combustor component. A specific embodiment that takes advantage of the benefits set forth above is a component for a gas turbine assembly, comprising a substrate 70 comprising one of a turbine blade, a vane, and a combustor component, wherein substrate 70 comprises at least about 60 atomic percent of a metal selected from the group consisting of Pt, Pd, Rh, Os, Ir, and mixtures thereof; and a thermal barrier layer 80 disposed over substrate 70, the layer 80 comprising yttria-stabilized zirconia.

The following example is set forth in order to compare performance of an exemplary embodiment of the present invention to a conventional protective system, and should not be construed as limiting the scope of the invention in any way.

To test the performance of a conventional system, a number of substrates comprising a state-of-the-art nickel-based superalloy were provided, each in the shape of a disk of thickness about 3 mm and diameter about 25 mm. Each substrate was coated with a layer of platinum-containing nickel aluminide about 0.05 mm thick using the electroplate and diffusion treatment described above for this type of coating. A layer of yttria-stabilized zirconia (YSZ), about 0.125 mm in thickness, was subsequently deposited by electron beam physical vapor deposition (EBPVD) over the aluminide layer. The coated substrates were then subjected to furnace cycle testing (FCT), wherein the substrates were heated to about 1160° C. and held at this temperature for about 45 minutes in an air furnace, and then taken out of the furnace and cooled for about 15 minutes with blowing air from a fan. The specimens were then re-loaded into the high temperature furnace and the thermal cycle was repeated. The YSZ layer spalled over 20% of each substrate surface (defined as "failure" of the coating system) after an average of about 230 cycles. Examination of the interface between the YSZ layer and the aluminide layer for each substrate revealed that a layer of TGO, generally about 4 to about 8 microns thick, was observable for each of the failed specimens.

To compare the conventional system performance, described above, with that of an exemplary embodiment of the present invention, a disk of thickness about 3 mm and diameter about 25 mm of an alloy comprising, in atomic percent, about 25% Pd, about 35% Pt, about 0.5% Zr, and the balance Rh, was coated with a layer of YSZ about 0.125 mm thick using EBPVD. This specimen was subjected to the same FCT thermal cycling as described above. In stark contrast to the specimens coated with the conventional system, no spalling of the YSZ layer was observed, even after 1000 cycles. The specimen was further FCT tested using a higher maximum temperature of about 1315° C., and no spalling was observed after 130 cycles. Scanning electron microscopy examination of the alloy/YSZ interface after the high temperature cyclic exposures showed no TGO formation.

While various embodiments are described herein, it will be appreciated from the specification that various combinations of elements, variations, equivalents, or improvements therein may be made by those skilled in the art, and are still within the scope of the invention as defined in the appended claims.

What is claimed is:

1. An article for use in a high temperature, oxidative environment, comprising:
   a substrate;
   a protective layer disposed over said substrate, said protective layer comprising at least about 60 atomic percent of a metal selected from the group consisting of Pt, Pd, Rh, Os, Ir, and mixtures thereof;
   a top layer disposed over said protective layer, said top layer comprising a thermal barrier layer; and
   a diffusion barrier layer interposed between said substrate and said protective layer, said diffusion barrier layer comprising ruthenium.

2. The article of claim 1, wherein said thermal barrier layer comprises a ceramic.

3. The article of claim 2, wherein said ceramic comprises yttria-stabilized zirconia.

4. The article of claim 1, wherein said thermal barrier layer has a thickness of at least about 25 microns.

5. The article of claim 4, wherein said thickness is in the range from about 100 microns to about 250 microns.

6. The article of claim 1, wherein said diffusion barrier layer has a thickness in the range from about 5 microns to about 100 microns.

7. The article of claim 1, wherein said substrate comprises a superalloy.

8. The article of claim 7, wherein said superalloy comprises at least one of a cobalt-based alloy, a nickel-based alloy, and an iron-based alloy.

9. The article of claim 8, wherein said alloy comprises one of a single crystal alloy and a directionally solidified alloy.

10. The article of claim 1, wherein said substrate comprises a component of a gas turbine assembly.

11. The article of claim 10, wherein said component comprises one of a turbine blade, a vane, and a combustor component.

12. The article of claim 1, wherein said protective layer comprises at least about 85 atomic percent of said metal.

13. The article of claim 1, wherein said protective layer has a thickness of at least about 5 microns.

14. The article of claim 13, wherein said thickness is in the range from about 10 microns to about 250 microns.

15. A component for a gas turbine assembly, comprising:
   a substrate comprising one of a turbine blade, a vane, and a combustor component;
   a diffusion barrier layer disposed over said substrate, said diffusion barrier layer comprising ruthenium;
   a protective layer disposed over said diffusion barrier layer, said protective layer comprising at least about 60 atomic percent of a metal selected from the group consisting of Pt, Pd, Rh, Os, Ir, and mixtures thereof; and
   a thermal barrier layer comprising yttria-stabilized zirconia disposed over said protective layer.

16. A material system for protecting an article in a high temperature, oxidative environment, said system comprising:
   a protective layer, said protective layer comprising at least about 60 atomic percent of a metal selected from the group consisting of Pt, Pd, Rh, Os, Ir and mixtures thereof;
   a top layer disposed over said protective layer, said top layer comprising a thermal barrier layer; and
   a diffusion barrier layer comprising ruthenium, wherein said protective layer is disposed over said diffusion barrier layer.

17. The system of claim 16, wherein said thermal barrier layer comprises a ceramic.

18. The system of claim 17, wherein said ceramic comprises yttria-stabilized zirconia.

19. The system of claim 16, wherein said thermal barrier layer has a thickness of at least about 25 microns.

20. The system of claim 19, wherein said thickness is in the range from about 100 microns to about 250 microns.

21. The system of claim 16, wherein said diffusion barrier layer has a thickness in the range from about 5 microns to about 100 microns.

22. The system of claim 21, wherein said thickness is in the range from about 10 to 50 microns.

23. The system of claim 16, wherein said protective layer comprises at least about 85 atomic percent of said metal.

24. The system of claim 16, wherein said protective layer has a thickness of at least about 5 microns.

25. The system of claim 24, wherein said thickness is in the range from about 10 microns to about 250 microns.

26. A material system for protecting a component of a gas turbine assembly, said system comprising:
   a diffusion barrier layer comprising ruthenium;
   a protective layer disposed over said diffusion barrier layer, said protective layer comprising at least about 60 atomic percent of a metal selected from the group consisting of Pt, Pd, Rh, Os, Ir, and mixtures thereof; and
   a thermal barrier layer comprising yttria-stabilized zirconia disposed over said protective layer.

27. A method for manufacturing an article for use in a high temperature, oxidative environment, comprising:
   providing a substrate;
   disposing a protective layer over said substrate, said protective layer comprising at least about 60 atomic percent of a metal selected from the group consisting of Pt, Pd, Rh, Os, Ir, and mixtures thereof;
   disposing a top layer over said protective layer, said top layer comprising a thermal barrier layer; and
   disposing a diffusion barrier layer comprising ruthenium over said substrate, wherein said diffusion barrier layer is interposed between said substrate and said protective layer.

28. The method of claim 27, wherein disposing said thermal barrier layer comprises depositing said thermal barrier layer using at least one of ion plasma deposition, physical vapor deposition, high-velocity oxyfuel deposition, plasma spraying, and chemical vapor deposition.

29. The method of claim 27, wherein disposing said thermal barrier layer comprises disposing a ceramic.

30. The method of claim 29, wherein disposing said ceramic comprises disposing yttria-stabilized zirconia.

31. The method of claim 27, wherein disposing said diffusion barrier layer comprises depositing said layer using at least one of ion plasma deposition, physical vapor deposition, high-velocity oxyfuel deposition, plasma spraying, chemical vapor deposition, and electroplating.

32. The method of claim 27, wherein providing said substrate comprises providing a superalloy, said superalloy comprising one of a cobalt-based alloy, a nickel-based alloy, and an iron-based alloy.

33. The method of claim 27, wherein providing said substrate comprises providing a component of a gas turbine assembly.

34. The method of claim 33, wherein said component comprises one of a turbine blade, a vane, and a combustor component.

35. The method of claim 27, wherein disposing said protective layer comprises depositing said protective layer using at least one of ion plasma deposition, physical vapor deposition, high-velocity oxyfuel deposition, plasma spraying, chemical vapor deposition, and electroplating.

36. The method of claim 27, wherein said protective layer comprises at least about 85 atomic percent of said metal.

37. A method for manufacturing a component for a gas turbine assembly, comprising:

providing a substrate selected from the group consisting of a turbine blade, a vane, and a combustor component;

disposing a diffusion barrier layer comprising ruthenium over said substrate;

disposing a protective layer over said diffusion barrier layer, said protective layer comprising at least about 60 atomic percent of a metal selected from the group consisting of Pt, Pd, Rh, Os, Ir, and mixtures thereof; and disposing a thermal barrier layer comprising yttria-stabilized zirconia over said protective layer.

* * * * *